E. A. McMURTRY.
PHOTOGRAPHIC EXPOSURE METER.
APPLICATION FILED JULY 29, 1916.

1,409,225.

Patented Mar. 14, 1922.

Inventor.
Edward A. McMurtry.

UNITED STATES PATENT OFFICE.

EDWARD A. McMURTRY, OF CHICAGO, ILLINOIS.

PHOTOGRAPHIC EXPOSURE METER.

1,409,225. Specification of Letters Patent. Patented Mar. 14, 1922.

Application filed July 29, 1916. Serial No. 112,163.

*To all whom it may concern:*

Be it known that I, EDWARD ALEXANDER McMURTRY, a citizen of the United States, residing at Chicago, in the county of Cook and State of Illinois, have invented certain new and useful Improvements in Photographic Exposure Meters, of which the following is a specification.

My invention relates to photographic exposure meters and has for its object to provide a new and simplified construction, in convenient card form, for an optical meter using a novel stop diaphragm which is placed immediately in front of, and close to, the eye, thereby acting as a temporary iris of the eye.

My invention is illustrated in the following figures of the accompanying drawing wherein—

Figure 1:
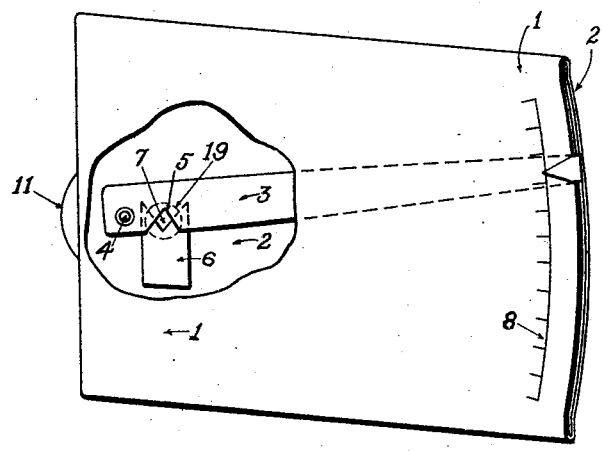
Figure 2:
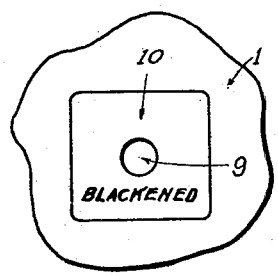
Figure 3:
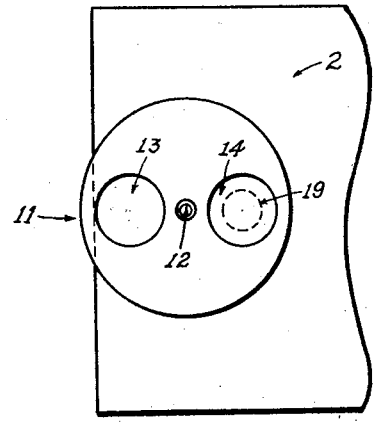

Fig. 1 is a perspective view of the meter complete. Fig. 2 is a view of the eye-piece. Fig. 3 is a detail of an accessory filter mechanism of simplified construction.

Similar numerals indicate like parts in all the drawings.

The meter consists of two cards 1 and 2 of celluloid, paper or other suitable material, joined together at their long edges so as to leave a small fraction of an inch between the cards. Upon card 2 the pointer arm 3 made from tin or other thin light material that is opaque, is pivoted at 4. This arm moves between the cards and has cut in it the V shown at 5. The piece of similar material 6 is securely joined to card 2 as shown and it also has a V in it. The V's in the arm and in the stationary piece form the diaphragm opening 7 which varies in size according to the position of the pointer on scale 8 over which it moves. Card 1 is shown broken out to reveal the stop mechanism beneath, (Fig. 1.)

Fig. 2 shows a detail view of the portion of card 1 broken out of Fig. 1. The aperture 9 is slightly larger than the largest diaphragm opening and the area 10 about it is made perfectly black and preferably polished. This forms an eye-piece that offers no bulk and is optically as efficient as any projecting eye-piece, which would spoil the convenient card form of the meter.

An aperture similar to 9 is cut out of card 2 so that the two coincide with the diaphragm operating between the apertures, (19, Fig. 1.)

Fig. 3 shows the way in which I propose to admit only actinic light. The principle here involved is not new and does not constitute a part of my invention. Disc 11 is pivoted on the outside of card 2 at 12, and projects slghtly over the edge. In it are cut two apertures 13 and 14 which may be turned so that one or the other covers the stop opening. In one aperture is placed a light transparent violet color filter for dark interiors. In the other is a deep violet filter for bright subjects.

The operation and use of my invention are as follows: The subject to be photographed is viewed through the diaphragm with the card held as close to the eye as possible. The diaphragm acts as a temporary iris of the eye. The pointer is moved over the scale until the detail in the darkest shadow requiring detail in the object is just on the point of disappearing. The pointer will indicate a certain letter on the scale. This letter is found in the table and under it the correct exposures for different camera stops. If the filter mechanism is used then the light value indicated by the pointer is found in the table for the particular filter in use, for two tables must be used. It will be seen that the meter above described is extremely simple compact and inexpensive as compared with other optical meters. The diaphragm is infinitely more simple to make than a graduated moving color filter and the use of this diaphragm as a temporary iris of the eye is novel. When highly orthochromatic plates are used no filter whatever is necessary to the use of the meter, with a special table for such plates or films. A card shaped meter is always desirable and easily carried in the vest pocket. The highly polished surface of black with its aperture, used as an eyepiece, is novel and very efficient, affording most of the advantages of the projecting type, without spoiling the card convenience of the meter.

I claim—

1. A photographic exposure meter consisting of two cards joined together at the edges, said cards having a viewing aperture extending through them both, a variable diaphragm operating in said aperture, a moving member operating between said cards, an indicator on said moving member and a scale giving exposures, said moving member controlling said diaphragm, and an eyepiece at said aperture consisting of a smooth dark area.

2. A photographic exposure meter with a stop diaphragm of variable aperture acting as a temporary iris of the eye made in card form with one or more violet color filters of different densities.

3. A photographic exposure meter, with a variable stop diaphragm substantially as described and for the purpose indicated, made in card form, having an eyepiece including a black area.

4. A photographic exposure meter made in card form, having a stop diaphragm of variable aperture which acts as a false iris of the eye, and one or more color filters of different densities, and an indicator member controlling said diaphragm.

5. A photometer comprising a card, a diaphragm secured thereto, a member pivoted on said card and operating said diaphragm, with a violet color filter covering said stop diaphragm and operating in conjunction therewith.

6. A photometric exposure meter comprising in combination a main body element of card form having a sighting aperture therein; said element having scales thereon giving exposures for various camera stops and plate speeds; a diaphragm member secured to said body element and extending over said aperture; a movable member pivoted on said body element cooperating with said scales; a complementary diaphragm member secured to said movable member and co-operating with said first mentioned diaphragm member; an actinic color filter covering the variable diaphragm formed by said diaphragm members, said diaphragm being adapted to act as a temporary iris of the eye of the operator.

7. A photometer comprising in combination, a stiff card having a view hole therein; a blackened area surrounding said view hole and forming an eyepiece; a diaphragm member having an aperture therethrough, secured across said view hole; an indicating member secured to said card but relatively movable thereon; a second diaphragm member rigidly attached to said indicating member and adapted to slide upon said first mentioned diaphragm member and form a variable diaphragm aperture therewith, said variable diaphragm being adapted to act as a false iris of the operator's eye.

8. A photometer comprising a card having a sighting hole extending therethrough; an eyepiece, containing a variable diaphragm aperture, and secured in said sighting hole; a moving member pivoted on said card and operatively connected to said diaphragm; and an actinic color filter covering said diaphragm aperture.

EDWARD A. McMURTRY.